US008725752B2

(12) United States Patent
Chakrabarti et al.

(10) Patent No.: US 8,725,752 B2
(45) Date of Patent: May 13, 2014

(54) METHOD, APPARATUS AND COMPUTER READABLE MEDIUM FOR INDEXING ADVERTISEMENTS TO COMBINE RELEVANCE WITH CONSUMER CLICK FEEDBACK

(75) Inventors: Deepayan Chakrabarti, Mountain View, CA (US); Deepak K. Agrawal, Sunnyvale, CA (US); Vanja Josifovski, Los Gatos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 37 days.

(21) Appl. No.: 13/414,004

(22) Filed: Mar. 7, 2012

(65) Prior Publication Data
US 2012/0166445 A1 Jun. 28, 2012

Related U.S. Application Data

(62) Division of application No. 12/120,038, filed on May 13, 2008, now abandoned.

(51) Int. Cl.
*G06F 7/00* (2006.01)
*G06F 17/30* (2006.01)

(52) U.S. Cl.
USPC .......................................................... 707/758

(58) Field of Classification Search
None
See application file for complete search history.

(56) References Cited

U.S. PATENT DOCUMENTS

| 7,827,060 B2* | 11/2010 | Wright et al. ............. 705/14.4 |
| 2003/0130994 A1* | 7/2003 | Singh et al. ..................... 707/3 |
| 2004/0059746 A1* | 3/2004 | Error et al. .................. 707/102 |
| 2004/0267725 A1* | 12/2004 | Harik ................................ 707/3 |
| 2005/0021397 A1* | 1/2005 | Cui et al. ...................... 705/14 |
| 2006/0149728 A1* | 7/2006 | Error et al. ...................... 707/5 |
| 2006/0173818 A1* | 8/2006 | Berstis et al. .................... 707/3 |
| 2006/0287920 A1* | 12/2006 | Perkins et al. ................. 705/14 |
| 2007/0027772 A1* | 2/2007 | Chou ............................ 705/14 |
| 2007/0156621 A1* | 7/2007 | Wright et al. ................. 706/48 |
| 2007/0198506 A1* | 8/2007 | Attaran Rezaei et al. ........ 707/5 |
| 2007/0239530 A1* | 10/2007 | Datar et al. ................... 705/14 |
| 2008/0154847 A1* | 6/2008 | Chellapilla et al. .............. 707/3 |
| 2009/0144133 A1* | 6/2009 | Cha et al. ....................... 705/10 |

* cited by examiner

*Primary Examiner* — Taelor Kim
(74) *Attorney, Agent, or Firm* — Brinks Gilson & Lione

(57) ABSTRACT

A method and apparatus are provided for better web ad matching by combining relevance with consumer click feedback. In one example, the method includes receiving a query page, extracting features from the query page, re-weighting the query page, evaluating the query page in light of each ad in order to score each ad and pick substantially best ad matches of the indexed ads, and returning the substantially best ad matches to the consumer computer.

11 Claims, 4 Drawing Sheets

METHOD, APPARATUS AND COMPUTER READABLE MEDIUM FOR INDEXING ADVERTISEMENTS TO COMBINE RELEVANCE WITH CONSUMER CLICK FEEDBACK

RELATED APPLICATION

The present application claims, under 35 U.S.C. 121, benefit and priority to and is a divisional of U.S. patent application Ser. No. 12/120,038, filed May 13, 2008 now abandoned, entitled "Method and Apparatus for Better Web Ad Matching by Combining Relevance with Consumer Click Feedback," which application is incorporated herein by reference.

FIELD OF THE INVENTION

The present invention relates to providing better web ads. More particularly, the present invention relates to providing better web ads by matching words on query pages with words on clicked web ads.

BACKGROUND OF THE INVENTION

Web advertising provides financial support for a large portion of today's Internet ecosystem, catering to a diverse set of websites, such as blogs, news, reviews, etc. Spurred by the tremendous growth in traffic in terms of volume, number of consumers, consumer engagement, content diversity, the last few years from 2008 have seen a tremendous growth in spending on web advertising.

A major part of the advertising on the web falls into the category of textual ads, which are typically short textual messages usually marked as "sponsored links" or similar. There are two main types of textual ads on the web today:
1. Sponsored search (i.e., paid search) advertising places ads on the result pages from a web search engine based on the search query. All major current web search engines support such ads and act simultaneously as a search engine and an ad agency.
2. Contextual advertising (i.e., Context Match) advertising places ads within the content of a generic, third-party web page. There usually is a commercial intermediary, called an ad-network, in charge of optimizing the ad selection with the twin goals of increasing revenue (shared between publisher and ad-network) and improving consumer experience. Here, the main players are the major search engines; however, there are also many smaller players.

While the methods proposed in this paper could be adapted for both sponsored search sponsored search and contextual advertising, the relevant background is primarily contextual advertising.

Studies have shown that displaying ads that are closely related to the content of the page provide a better consumer experience and increase the probability of clicks. This intuition is analogous to that in conventional publishing, where there are very successful magazines (e.g., Vogue) where a majority of the content is topical advertising (e.g., fashion, in the case of Vogue). Thus, estimating the relevance of an ad to a page is critical in serving ads at run-time.

Previously, published approaches estimated the relevance based on co-occurrence of the same words or phrases within the ad and within the page. The model used in this body of work is to translate the ad search into a similarity search in a vector space. Each ad is represented as a vector of features, as for example, unigrams, phrases and classes. The page is also translated to a vector in the same space as the ads. The search for the substantially best ads is now translated into finding the ad vectors that are closest to the page vector. To make the search efficient and scalable to hundreds of millions of ads and billions of requests per day, an ad system can use an inverted index and an efficient similarity search algorithm. A drawback of this method is that it relies on a-priori information and does not use the feedback (a posteriori) information that is collected in the form of ad impressions (displays) and clicks.

Another line of work uses click data to produce a CTR (click through rate) estimate for an ad, independent of the page (or query page, in the sponsored search scenario). The CTR is estimated based on features extracted from the ads that are then used in a learning framework to build models for estimation of the CTR of unseen ads. In this approach, the assumption is that the ad system selects the ads by a deterministic method—by matching the bid phrase to a phrase from the page (or the query page in sponsored search). Accordingly, to select the most clickable ads, the ad system only needs to estimate the CTR on the ads with the matching bid phrase. This simplifying assumption of the matching process is an obvious drawback of these approaches. Another drawback is that these methods do not account for differential click probabilities on different pages: If some pages in the corpus attract an audience that clicks on ads significantly more than average, then the learning of feature weights for ads will be biased towards ads that were (only by circumstance) shown on such pages.

SUMMARY OF THE INVENTION

What is needed is an improved method having features for addressing the problems mentioned above and new features not yet discussed. Broadly speaking, the present invention fills these needs by providing a method and apparatus for providing better web ad matching by combining relevance with consumer click feedback. It should be appreciated that the present invention can be implemented in numerous ways, including as a method, a process, an apparatus, a system or a device. Inventive embodiments of the present invention are summarized below.

In one embodiment, a method is provided for comparing query pages to indexed ads in order to provide better web ad matching. The method comprises receiving a query page, extracting features from the query page, re-weighting the query page, evaluating the query page in light of each ad in order to score each ad and pick substantially best ad matches of the indexed ads, and returning the substantially best ad matches to the consumer computer.

In another embodiment, a method is provided for indexing ads in order to provide better web ad matching. The method comprises receiving ads that were clicked at a consumer computer, extracting ad features from the ads, sorting the ads according to ad identification to provide a data file, and inverting the data file to sort the data file according to feature identification, wherein sorting the ads includes computing a static score for each ad using parameters learnt using logistic regression on some training data.

In still another embodiment, an apparatus is provided for comparing query pages to indexed ads in order to provide better web ad matching, wherein the apparatus is configured to receive a query page. The apparatus comprises a page feature extraction device configured to extract features from the query page, a page feature re-weighting device configured to re-weight the query page, a page evaluation device configured to evaluate the query page in light of each ad in order to score each ad and pick to obtain substantially the best ad matches of the indexed ads, wherein the apparatus is configured to return the substantially best ad matches to the consumer computer.

In yet another embodiment, an apparatus is provided for indexing ads in order to provide better web ad matching, wherein the apparatus is configured to receive ads that were clicked at a consumer computer. The apparatus comprises an ad feature extraction device configured to extract ad features from the ads, an ad identification assignment device configured to sort the ads according to ad identification to provide a data file, and an ad inversion sort device configured to invert the data file to sort the data file according to feature identification, wherein the apparatus is further configured to sort the ads by computing a static score for each ad using parameters learnt using logistic regression on some training data.

In still yet another embodiment, a computer readable medium is provided carrying one or more instructions for comparing query pages to indexed ads in order to provide better web ad matching. The one or more instructions, when executed by one or more processors, cause the one or more processors to perform the steps of receiving a query page, extracting features from the query page, re-weighting the query page, evaluating the query page to obtain substantially best ad matches of the indexed ads, and calculating a final score for each ad in order to pick substantially best ad matches.

The invention encompasses other embodiments configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION OF THE INVENTION

An invention for a method and apparatus for provided better web ad matching by combining relevance with consumer click feedback is disclosed. Numerous specific details are set forth in order to provide a thorough understanding of the present invention. It will be understood, however, to one skilled in the art, that the present invention may be practiced with other specific details.

General Overview

Figure 1:
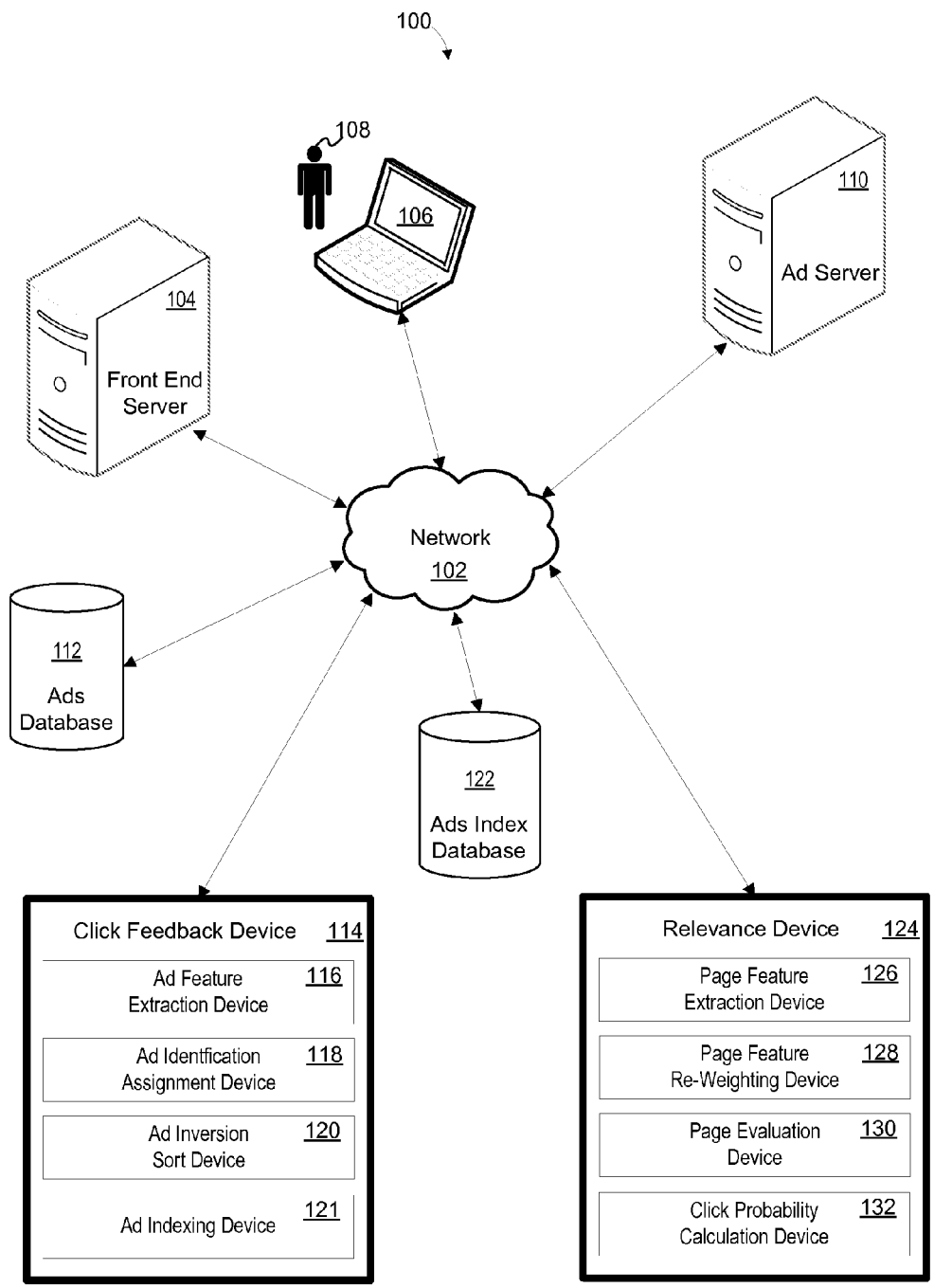
FIG. 1 is a block diagram of a system for providing better web ad matching by combining relevance with consumer click feedback, in accordance with an embodiment of the present invention.

FIG. 1 is a block diagram of a system 100 for providing better web ad matching by combining relevance with consumer click feedback, in accordance with an embodiment of the present invention. A device of the present invention is hardware, software or a combination thereof. A device may sometimes be referred to as an apparatus. Each device is configured to carry out one or more steps of the method of providing better web ad matching by combining relevance with consumer click feedback.

The network 102 couples together a front end server 104, a consumer computer 106, an ad server 110, an ads database 112, a click feedback device 114, an ads index database 122 and a relevance device 124. The network 102 may be any combination of networks, including without limitation the Internet, a local area network, a wide area network, a wireless network and a cellular network. The click feedback device 114 includes without limitation an ad feature extraction device 116, an ad identification assignment device 118, an ad sort device 120 and an ad indexing device 121. The relevance device 124 includes without limitation a page feature extraction device 126, a page feature re-weighting device 128, a page evaluation device 130 and a click probability device 132.

Alternatively, one apparatus may contain two or more devices of the system 100. For example, one apparatus may contain two or more of the devices that include, for example, the front end server 104, the click feedback device 114, the ads index database 122 and the relevance device 124.

The system 100 is based on logistic regression, a popular technique in statistics and machine learning. The regression enables the system 100 to combine click feedback and semantic information available from both pages and ads to determine relevancy. This system 100 is more general than a pure relevance based approach that does not use click feedback in any form. Indeed, experiments performed with the system 100 convincingly demonstrate the usefulness of using click feedback to find more relevant ads. There has been prior work that involves using regression models for determining relevant ads. While it has a similar flavor of the present system 100, only ad-specific features are learnt in such prior art, and ad specific features are only a subset of the features that the system 100 utilizes. In particular, in addition to page and ad specific features, the system 100 learns features that capture interactions between pages and ads. Furthermore, the system 100 combines word-based features with traditional relevance measures to enhance matching relevant ads to pages.

The models of the system 100 are more granular and can incorporate larger number of features. Such incorporation reduces bias in CTR estimates and leads to better performance. However, reduced bias comes at the price of increased variance, which can become a serious problem if the models become too granular and start over-fitting the training data.

To balance these two issues, the system 100 utilizes a two-pronged strategy. First, the system 100 uses a relatively large but specially selected set of features, where the selection mechanism ensures that the features have reasonable support. The system 100 also provides a mechanism based on prior probabilities to down-weight features that are too sparse.

The second strategy the system 100 uses to prevent overfitting is for the system 100 to train its models on an extremely large corpus (e.g., billions of records, several thousand features), which automatically increases the support of a large number of features. Fortunately, data is plentiful especially for big ad-networks that serve a large number of publishers and advertisers. However, increased training size poses a difficult computational challenge of scaling logistic regression to web scale data. The system 100 overcomes this difficulty by using an approximation based on a "divide and conquer strategy". In other words, the system 100 randomly splits its training corpus into several pieces and fits a separate logistic regression to each piece. The system 100 obtains the final result by combining estimates from all the pieces.

The system 100 carries out a method that involves three broad steps—(a) feature extraction, (b) feature selection, and (c) coefficient estimation for features through a logistic regression. A detailed description of each of these steps is provided below.

Feature Extraction

The system 100 treats pages and ads as being composed of several regions. For instance, a page is composed of page title, page metadata, page body, page URL etc. Similarly, an ad is composed of ad title, ad body etc. Within each region, the ad feature extraction device 116 and the page feature extraction device 126 each extract a set of words/phrases after stop word removal. The system 100 associates a score (e.g., region specific tf, tf-idf) to each word that measures its importance in a given region. The score may be, for example, region specific tf (term frequency) or tf-idf (term frequency-inverse document frequency). For a given page/ad region combination, this model has three sets of features that are described below.

The first feature set is page region specific main effects. Web pages are usually composed of multiple regions with different visibility and prominence. Accordingly, the impact of each region on the ad selection can vary. The system 100 learns the effect of each region separately. For a word w in page region p(r) with score $t_{p(r)w}$, the region-specific main effect is defined as $$M_{p(r)w} = 1(w \in p(r)) \cdot t_{p(r)w}.$$ Equation 1.

In other words, if the word is present in the page region p(r), the feature contributes its score else it does not contribute. These features provide an estimate of word popularity. These features are not useful at the time of selecting relevant ads for a given page but help in getting better estimates of other terms in the model after adjusting for the effect of popular words on a page. For instance, if "camera" pages are popular in terms of CTRs and 90% of the corpus consists of camera pages, "camera" ads that were the ones mostly shown on camera pages would tend to become popular even on "soccer" pages which constitute only 1% of the total corpus. By incorporating page words in the model, the system 100 adjusts for this effect and gets the correct matching ads for "soccer" pages.

The second feature set is ad region specific main effects. Ads are also composed of multiple regions, some visible to the consumer (title, abstract) and some used only in the ad selection (bid phrase, targeting attributes). As with the page regions, the ad regions can have a different impact on the ad selection. For a word w in ad region a(r) with score $t_{a(r)w}$, this is defined as $$M_{a(r)w} = 1(w \in a(r)) \cdot t_{a(r)w}.$$ Equation 2.

Unlike page specific main effects, ad region specific main effects do play an important role when selecting relevant ads for a given page and provide more weight to popular ads.

The third feature set is interaction effects between page and ad regions. For a word $w_1$ in page region $p(r_1)$ and word $w_2$ in ad region $a(r_2)$ with score $f(t_p(r_1) w_1, t_a(r_2) w_2)$ for some function $f$, this is given as $$I_{p(r_1)w_1,a(r_2)w_2} = 1(w_1 \in p(r_1), w_2 \in a(r_2)) \cdot f(t_{p(r_1)w_1}, t_{a(r_2)w_2}).$$ Equation 3.

The system 100 confines itself to the case where $w_1 = w_2$. In other words, the feature "fires" only if the same word occurs in both the corresponding page and ad regions. However, one can generally consider co-occurrences of synonyms or related words. Examples of $f$ include the product function $t_p(r_1)w_1 \times t_a(r_2)w_2$, the geometric mean $\sqrt{t_{p(r_1)w_1} \times t_{a(r_2)w_2}}$ and so on. Interaction effects are important components of the system 100 and help in matching relevant ads to a given page. For instance, occurrence of the word "camera" in the ad body is a strong indication of the ad being relevant for the page whose title contains the word "camera," with the degree of relevance being determined by the regression.

Feature Selection

For any given (page, ad) region combination, a large number of words occur in the training data. Using them all as features might make the logistic regression ill-conditioned and inflate variance of the coefficient estimates. Accordingly, the system 100 takes recourse to variable selection techniques which select a subset of important words to be used in its regression. Variable selection in the context of regression is a well studied area with a rich literature. Stepwise backward-forward automated variable selection algorithms are widely used for large scale applications, but these methods have drawbacks, especially when features are correlated. The general recommendation is to use as much domain knowledge as possible instead of using an automated procedure to select relevant variables. However, in large scale settings as in the system 100, some level of automation is necessary.

For reasons of scalability, the system 100 uses a two-stage approach. In the first stage, the system 100 conservatively prunes non-informative features using simple measures that can be computed using only a few passes over the training corpus. In the second stage, the system 100 fits a regression to all the selected features from the first stage but down-weights them through a specially constructed prior that pools data from all the features. Meanwhile, the system 100 preferably picks the features that are less sparse. The second state is discussed below in more detail in the Approximate Logistic Regression section. The variable selection methods are discussed next.

The system 100 selects the variables using two methods. The first method is based on clicks and views. The second method is based on relevance scores of words that are independent of any click feedback. In the first approach (data-based), the system 100 ranks words based on a measure that quantifies the interaction between words occurring in the page and ad regions. For a word w, the interaction measure is defined as $$I_w = \frac{CTR_w^{both}}{CTR_w^{page} \cdot CTR_w^{ad}},$$ Equation 4.

where $CTR_w^{both}$ denotes the CTR when w occurred both on page region and ad region of an ad displayed on a page, and $CTR_w^{page}$ and $CTR_w^{ad}$ denote the marginal CTRs when w is shown on the page and ad regions, respectively. Higher values of the ratio indicate stronger interaction being induced by the presence of the word w which in turn should enhance the matching quality of ads to pages. A variation of the measure above may be tried with a square root of the denominator, which will likely yield with no significant impact.

In the second approach (relevance-based), words are ranked by computing the average tf-idf scores across the entire page and ad corpus for the respective regions under consideration. Here, the system 100 may involve two measures: (a) Create a single corpus by treating page and ad regions as documents and compute a single tf-idf average score for each word; and (b) Treat the page and ad regions as different corpora and use the geometric mean of tf-idf scores computed separately from page and ad regions for each word.

For both measures, the system 100 picks, for example, the top 1000 words and uses them in the logistic regression. To avoid noisy estimates of CTRs in the ratio, the system 100 only considers words that are shown simultaneously on ad and page regions at least 10 times and have non-zero marginal probabilities. It turns out that the data-based approach gives better results for the same number of words.

Approximate Logistic Regression

Let $y_{ij}$ denote the binary click outcome (1 for click, 0 for no click) when ad j is shown on page i. Assume $y_{ij}$ has a Bernoulli distribution with CTR $p_{ij}$. In other words, the probability distribution of $y_{ij}$ is given by $P(y_{ij}) = p_{ij}^{y_{ij}} (1-p_{ij})^{1-y_{ij}}$. To determine relevant ads for a given page i, the system 100 needs to estimate $p_{ij}$'s, with higher values indicating more relevant ads. For ads that are shown a large number of times on a page, the system 100 can estimate the CTR empirically by clicks per impression. However, for purposes here, a large fraction of page-ad pairs have a small number of impressions. In fact, since the CTRs are typically low (0.1%-20% with a substantial right skewness in the distribution), the number of impressions required to get precise empirical estimates are high. For instance, to estimate a 5% CTR, the system 100 needs 1,000 impressions to be even 85% confident that the estimate is within 1% of the true CTR. Thus, the system 100 takes recourse to feature based models. In other words, $p_{ij}$ is a function of features extracted from page and ad regions as discussed above in the Feature Extraction section.

To allow for arbitrary real-valued coefficients for features, it is routine to map $p_{ij}$ onto the real line via a monotonically increasing function. The most widely used function is the logit which maps $p_{ij}$ to $\text{logit}(p_{ij}) = \log[p_{ij}/(1-p_{ij})]$. Assume $\text{logit}(p_{ij})$ is a linear function of features representing the main effects and interaction effects discussed in the Feature Extraction section. For simplicity, consider a single (page, ad) region combination ($p(r_1)$, $a(r_2)$). The linear function in the logistic regression is given by $$\text{logit}(p_{ij}) = \text{logit}(q_{ij}) + \sum_w \alpha_w M_{p(r_1)w} + \sum_w \beta_w M_{a(r_2)w} + \sum_w \delta_{w,r_1,r_2} I_{p(r_1)w,a(r_2)w}. \quad \text{Equation 5}$$

where $w=(\alpha,\beta,\delta)$ are unknown feature coefficients to be estimated by logistic regression, and $\text{lit}(q_{ij})$ are known prior log-odds that could have been derived from a different model. For instance, a uniform prior would assume $q_{ij}=\hat{p}$, where $\hat{p}$ is the average CTR on the entire training corpus. Another possibility is to derive prior log-odds $q_{ij}$ by combining relevance scores with click feedback.

To add new (page,ad) region combination, the system 100 only needs to augment Equation 5 with the appropriate linear terms for the page main and ad main effects. For the interaction effects, the system 100 re-parameterizes its model to facilitate indexing. The re-parameterization is explained here. The connection to indexing is discussed below in the Ad Search Prototype section. For each (page,ad) combination ($r_1$, $r_2$), a word w that occurs in both $r_1$ and $r_2$ has a coefficient $\delta_{w,r_1,r_2}$ which depends on the word w, the page region and the ad region. We assume parameterization, as in $$\delta_{w,r_1,r_2} = \delta_w \cdot \gamma_{p(r_1)} \cdot \gamma_{a(r_2)}. \quad \text{Equation 6}$$

In other words, the interaction of a word for a given page and ad region combination is factored into word-specific, page-specific and ad-specific components. Accordingly, for M words, $R_1$ page regions, $R_2$ ad regions, the number of parameters equals $M+R_1+R_2$ as opposed to $M \cdot R_1 \cdot R_2$ in the original model. The estimate of coefficients is obtained by maximizing the log-likelihood of the data as given by $$\sum_{ij} (y_{ij} \log(p_{ij}) + (1-y_{ij}) \log(1-p_{ij})). \quad \text{Equation 7}$$

where $p_{ij}$ is given by Equation 5. The optimization problem described above may become ill-conditioned and lead to high variance estimates if features tend to be correlated or are sparse or both. This is a drawback in our scenario where feature sparsity and correlations are routine. To provide a robust solution, the system 100 put additional constraints on the coefficients in the form of priors.

A prior of $N(0,\sigma^2)$ would mean that the parameter estimates are pinned down in the range $(-3\sigma, 3\sigma)$ with 99% probability a-priori. In the absence of enough information about the coefficient from data, this ensures that the coefficient estimates do not diverge to the boundaries and cause numerical instability. To put more stringent constraints on sparse features, the system 100 down-weights the prior variance $\sigma^2$ by a measure of relative sparsity, which is the variance of the feature occurrence process relative to average feature occurrence variance. The feature occurrence variance is given by $s(1-s)$, where s is the fraction of times the feature occurs. In particular, a set of relationships is provided as $$\alpha_w \sim N\left(0, \sigma^2 \cdot \frac{s_p(w)(1-s_p(w))}{s_p(1-s_p)}\right) \quad \text{Equation 8}$$

$$\beta_w \sim N\left(0, \sigma^2 \cdot \frac{s_a(w)(1-s_a(w))}{s_a(1-s_a)}\right)$$

$$\delta_w \sim N\left(0, \sigma^2 \cdot \frac{s_I(w)(1-s_I(w))}{s_I(1-s_I)}\right).$$

Note that separate averages are used for the main page and ad effects, and interaction effects (indicated by the subscripts p, a, and I). In real experiments, $\sigma^2=9$; experiments with several other values in the range of 3 to 20 have been found not to yield much difference in the results.

Now, the optimization problem reduces to estimating the coefficients by maximizing the log-posterior which is the sum of the log-likelihood (Equation 7) and the log-prior of the coefficients, as discussed above. Next, the optimization process itself is discussed.

Several approaches to optimize the objective function exist. Among the ones that have been used in large-scale applications are iterative scaling, nonlinear conjugate gradient, quasi-Newton, iteratively-reweighted least squares, truncated Newton, and trust-region Newton. All these methods are iterative and generate a sequence of estimates that converge to the optimal solution. For all methods except iterative scaling, cost per iteration is high but the convergence is fast. For iterative scaling which updates one component at a time, cost per iteration is low but convergence is slower. For application here, the training corpus typically has several million data points and several thousand features, making it extremely slow to fit the model using these approaches on a single machine. To scale the computations, the system 100 utilizes a simple parallelization approach that randomly splits the data into several parts, fits a logistic regression separately to each part and then combines the estimates obtained from each piece. For convenience, the system 100 may perform its computation in a MapReduce framework. MapReduce is a conventional programming model for processing large data sets. It runs on a large cluster of commodity machines; it is highly scalable processing several gigabytes of data on thousands of machines and easy to use. The run-time system automatically takes care of the details of partitioning the data, scheduling jobs across machines, handling failures and managing inter-machine communication.

To fit a logistic regression for a given piece, the system 100 uses a simple iterative scaling (also known as conditional maximization) approach. The algorithm is as follows: Initialize the coefficients α's, β's, and δ's to 0, and $\gamma_{p()}$'s and $\gamma_{a()}$'s to 1; then update the value of each coefficient one at a time holding the others fixed at the current value by maximizing the likelihood through a Newton-Raphson method. This completes a single iteration. The procedure is continued through several iterations until convergence. The method is substantially guaranteed to converge since every step can only increase the likelihood. Along with a coefficient estimate, the Newton-Raphson procedure provides an estimate of the negative Hessian, the inverse of which provides an estimate of variance of the coefficient from maximum likelihood theory. The results on the various data partitions are combined using a weighted average of the individual estimates, where the weight assigned to partition-specific estimate is its relative precision obtained from the negative Hessian values. This weighting scheme is the substantially best way to combine estimates through a linear function.

Ad Search Prototype

Figure 2:
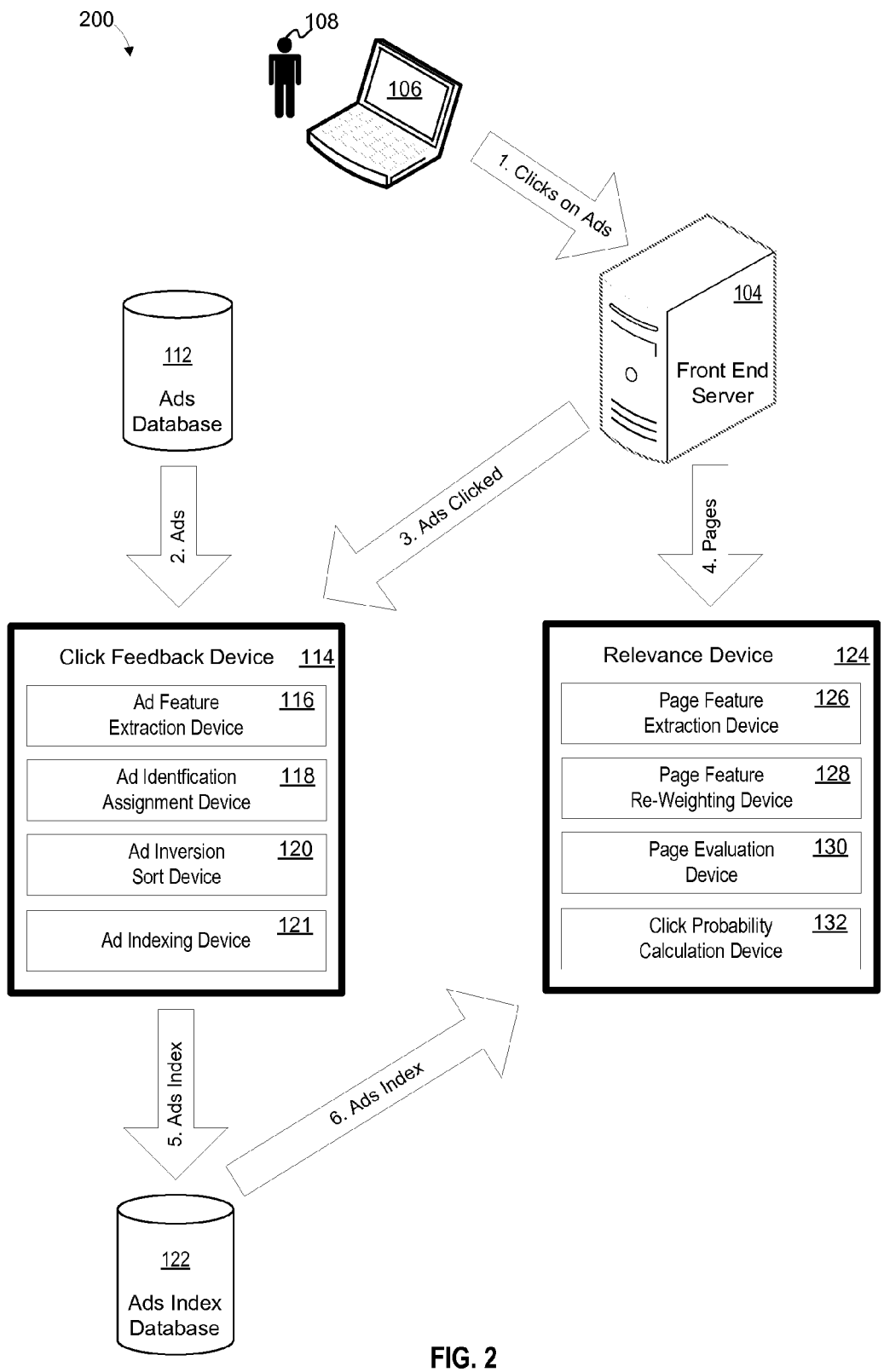
FIG. 2 is a schematic diagram of a system for providing better web ad matching by combining relevance with consumer click feedback, in accordance with an embodiment of the present invention.

FIG. 2 is a schematic diagram of a system 200 for providing better web ad matching by combining relevance with consumer click feedback, in accordance with an embodiment of the present invention. A key feature of the system 200 is that it is suitable for efficient evaluation over inverted ad indexes. This section discusses an implementation of the system 200, which is a prototype ad search engine based on a query page evaluation algorithm and inverted indexing of the ads. The relevance device 124 including the page evaluation device 130 may involve, for example, calculations using a conventional WAND algorithm. The click feedback device 114 including the ad inversion sort device 120 may involve, for example, calculations using a conventional Hadoop computing framework.

The system 200 allows for any kind of feature to be used in the ad search. The system 200 uses unigrams, phrases and classes as features. The ads index database 122 (i.e., inverted index) is composed of one postings list for each feature that has one entry (i.e., posting) for each ad that contains this feature. The ads are represented in the ads index database 122 by adIDs, which are unique numeric identifiers assigned to each ad.

Consumers 108 from a multiple consumer computers 106 click on ads on web pages. The front end server 104 informs the ads click feedback device 114 of the ads clicked. The click feedback device 114 also has access to the ads database 112.

The system 200 produces the inverted ad index over preferably a grid of machines running the ad inversion framework. The indexing starts with the ad feature extraction device 116 extracting features from the ads. The ad identification assignment device 118 represents each feature by a unique numeric featureID and sorts the resulting data file by <ad ID, featureID>. Next, the ad inversion sort device 120 inverts this file by sorting the file by <featureID, adID> as a key. The ad indexing device 121 then writes the inverted data file (delta compressed posting lists) into the ads index database 122. The system 200 uses the ads index database 122 later during query runtime in order to evaluate queries.

There are a few important differences in this ad search engine that require a different approach compared to web search engines. First, in web search, the queries are short and the documents are long. In the present ad search case, the number of features per ad is usually lower than the number of features extracted from a web page, which represent the ad space query here. So, it is almost never the case that an ad will contain all the features of the ad search query. Accordingly, the ad search engine performs similarity search in the vector space with a long query and relatively short ad vectors. In contrast, for the majority of the web queries, there are many pages that contain all the query words. One of the key issues is how to rank the pages containing the query.

The relevance device 124 includes architecture for analyzing content of query pages where the ads are shown. The page feature extraction device 126 extracts features from a query page. The page feature re-weighting device 128 breaks down the query page into a bag of pairs <featureID, weight>. For each query page feature, the page evaluation device 130 opens a cursor over the posting list of this feature. During the evaluation, the page evaluation device 130 moves the cursors forward examining the documents (ads) as the documents are encountered from the ads index database 122. The page evaluation device 130 is configured to find the next cursor to be moved based on an upper bound of the score for the documents at which the cursors are currently positioned. The page evaluation device 130 keeps a heap of current candidates. The invariant of the page evaluation device 130 is that the heap contains the substantially best matches (highest scores) among the documents (ads) with IDs less than the document pointed by the current minimum cursor.

Cursors pointing on documents with upper bound smaller than the minimum score among the candidate documents are candidates for a move. To find the upper bound for a document, the page evaluation device 130 assumes that all cursors that are before the current will hit this document (i.e. the document contains all those terms represented by cursors before or at that document). It has been shown that the system 200 can use the page evaluation device 130 with any function that is monotonic with respect to the number of matching terms in the document. It can also be easily shown that some non-monotonic scoring functions can also be used as long as the system 200 can find a mechanism to estimate the score upper bounds.

One family of such functions is a set of functions where a fixed subset of the features (known a priori) always decreases the score. In such cases, the upper bound estimates just assume that these features do not appear in the ad. An example of such function is a cosine similarity where some of the query page coefficients are negative. The scoring function proposed in this invention might have such coefficients and fits well within the framework of the page evaluation device 130.

The system 200 incorporates the logistic-regression based model, which is an important feature of the present invention. The system 200 modifies the scoring Equation 5 to exclude the page effect and uses Equation 5 as a scoring formula for the page evaluation device 130 (e.g., WAND). The click feedback device 114 uses $M_{a(r)}$ of Equation 2 during indexing (i.e., sorting) to calculate a static score for each individual ad. The ad identification assignment device 118 uses this score to assign an adID to the ads in decreasing ad score order. This scoring allows for estimating upper bounds of the ads that are skipped by using the score of the ad pointed by the preceding cursor in the sorted cursor list. The ad indexing device then writes the indexed ads to the ads index database 122.

After the relevance device 124 parses the page and extracts the features along with their tf-idf scores, the page re-weighting device 128 applies the reweighing based on the $I_w$ of Equation 4. The click feedback device does not use $M_{p(r)}$ of Equation 1 in the ad selection. Rather, the click probability calculation device 132 may use $M_{p(r)}$ of Equation 1 to adjust the final scores to calculate the probabilities according to Equation 5.

Method Outline

Figure 3:
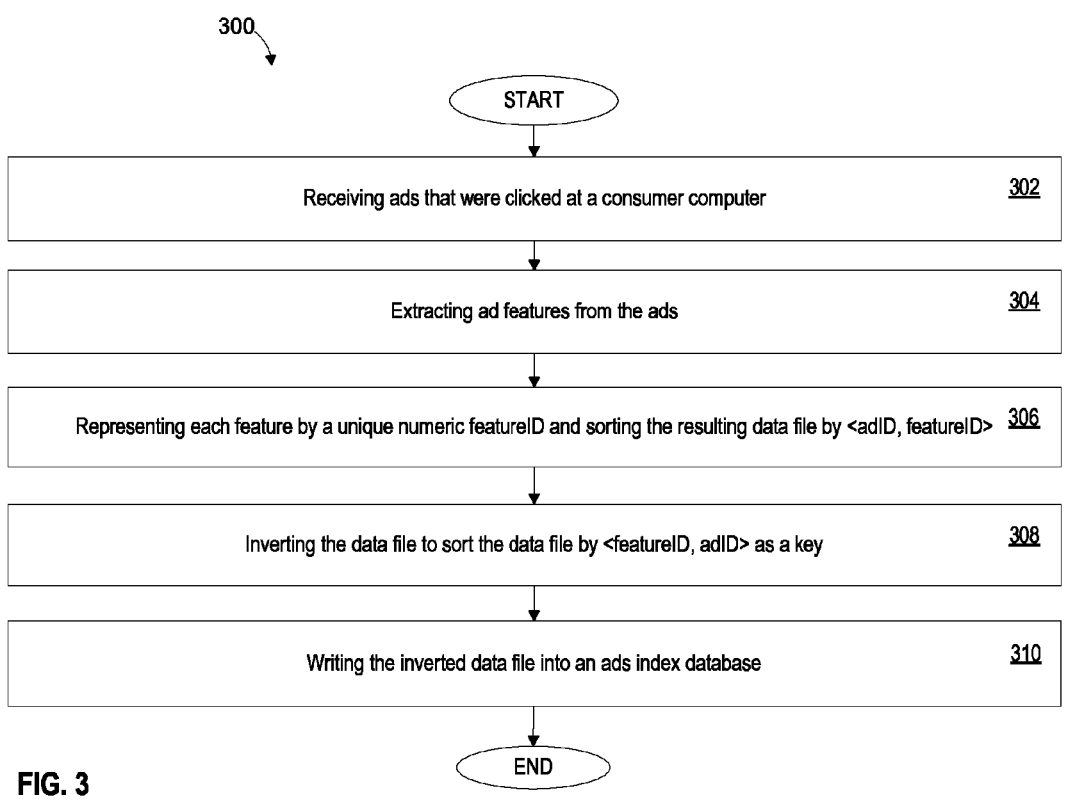
FIG. 3 is a flowchart of a method of indexing ads in order to provide better web ad matching, in accordance with an embodiment of the present invention.

FIG. 3 is a flowchart of a method 300 of indexing ads in order to provide better web ad matching, in accordance with an embodiment of the present invention. The method 300 starts in step 302 where the system receives ads that were clicked at a consumer computer. The click feedback device 114 of FIG. 2 may be configured to carry out this step 302. The method 300 then moves to step 304 where the system extracts ad features from the ads. The ad feature extraction device 116 of FIG. 2 may be configured to carry out this step 304. Next, in step 306, the system represents each feature by a unique featureID and sorts the results data file by <adID, featureID>. The ad identification assignment device 118 of FIG. 2 may be configured to carry out this step 306. The method 300 then proceeds to step 308 where the system inverts the data file to sort the data file by <featureID, adID> as a key. The ad inversion sort device 120 of FIG. 2 may be configured to carry out this step 308. Then, in step 310, the system writes the inverted data file into an ads index database. The ad indexing device 121 of FIG. 2 may be configured to carry out this step 310. The sorting and indexing in the method 300 include use of logistic regression according to $M_{a(r)}$ of Equation 2. The method 300 is then at an end.

Figure 4:
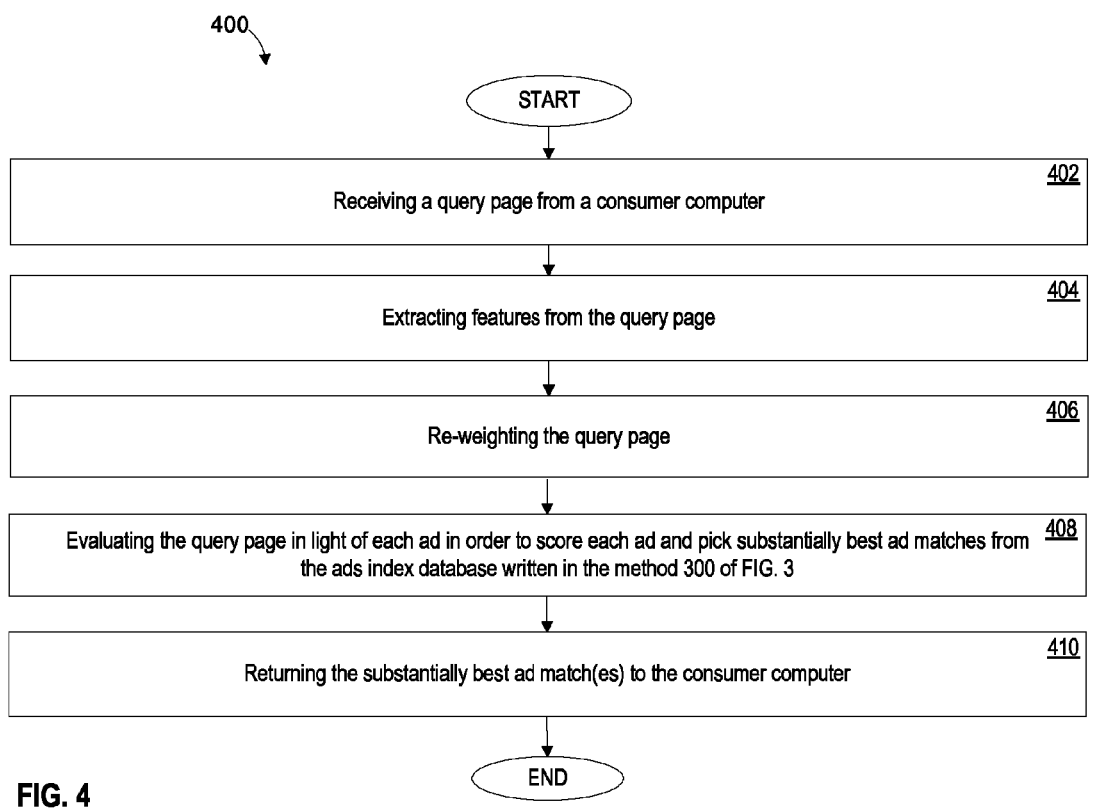
FIG. 4 is a flowchart of a method for comparing query pages to indexed ads in order to provide better web ad matching, in accordance with an embodiment of the present invention.

FIG. 4 is a flowchart of a method 400 for comparing query pages to indexed ads in order to provide better web ad matching, in accordance with an embodiment of the present invention. The method 400 starts in step 402 where the system receives a query page from a consumer computer. The relevance device 124 of FIG. 2 may be configured to carry out this step 402. The method 400 then moves to step 404 where the system extracts features from the query page. The page feature extraction device 126 of FIG. 2 may be configured to carry out this step 404. Next, in step 406, the system re-weights the query page. The page feature re-weighting device 128 of FIG. 2 may be configured to carry out this step 128. The re-weighting is based on $I_w$ of Equation 4. The method 400 then proceeds to step 408 where the system evaluates the query page in light of each ad in order to score each ad and pick substantially best ad matches from the ads index database written in the method 300 of FIG. 3. The page evaluation device 130 of FIG. 2 may be configured to carry out this step 408. Note that the system computes a score for almost all (page, ad) pair and then uses this score to judge which ads are the best for the given page. Substantially, the only time the system does not compute such scores is when the system evaluates that the score will not be high enough for a particular ad to be among the substantially best ads. It is not the case that the system computes scores only for the substantially best ad matches. Then, in step 410, the system returns the substantially best ad match(es) to the consumer computer. The relevance device 124 of FIG. 2 may be configured to carry out this step 410. The method 400 is then at an end.

The method 400 may involve an optional step where the system calculates a final score for each of the substantially best ad matches. The click probability calculation device 132 of FIG. 2 may be configured to carry out this optional step. This final static scoring involves use of $M_{p(r)}$ of Equation 1 to adjust the final scores to calculate the probabilities according to Equation 5.

The top scoring ads in the top ads database may be used later during runtime of a query. Thus, better matching ads can be had for the query.

Computer Readable Medium Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application-specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical disks, Digital Versatile Discs (DVDs), Compact Disc Read-only memory (CD-ROMs), micro-drives, and magnetic or optical disks, Read-Only Memory (ROMs), Random Access Memory (RAMS), Erasable Programmable Read Only Memory (EPROMs), Electrically Erasable Programmable Read-Only Memory (EEPROMs), Dynamic Random Access Memory (DRAMs), Video Random Access Memory (VRAMs), flash memory devices (including flash cards), magnetic or optical cards, nanosystems (including molecular memory ICs), Redundant Array of Independent Disks (RAID) devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human consumer or other mechanism utilizing the results of the present invention. Such software may include, but is not limited to, device drivers, operating systems, and consumer applications. Ultimately, such computer readable media further includes software for performing the present invention, as described above.

Included in the programming (software) of the general/specialized computer or microprocessor are software modules for implementing the teachings of the present invention, including without limitation receiving a query page, extracting features from the query page, re-weighting the query page, evaluating the query page to obtain substantially best ad matches of the indexed ads, and calculating a final score for each ad in order to pick substantially best ad matches, according to processes of the present invention.

Advantages

The system of the present invention provides a new model to combine relevance with click feedback for a contextual advertising system. The model is based on a logistic regression and allows for a large number of granular features. The key feature of the modeling approach is the ability to model interactions that exist among words between page and ad regions in a way that is suitable for efficient evaluation over inverted indexes. In fact, the system employs a multiplicative factorization to model the interaction effects for several (page, ad) regions in a parsimonious way that facilitates fast look-up of ads at query runtime. Large scale experiments have been proven the advantage of combining relevance with click feedback. In fact, experiments have achieved a 25% lift in precision for a recall value of 10% relative to a pure relevance based model.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A system for indexing an advertisement in order to match the advertisement to a webpage, the system comprising:
   a communications interface configured to receive click-through rate (CTR) data for an advertisement;
   a processor and memory communicatively coupled to the communications interface configured to:
   extract an advertisement feature from the advertisement and a webpage feature from the webpage that are relevant to each other, via a variable selection technique that includes at least one of: selection of the advertisement feature and the webpage feature using CTR data and views of the advertisement, or selection of the advertisement feature and the webpage feature using relevance scores of words of the advertisement that are independent of click feedback;
   calculate a coefficient representative of the relevancy between the advertisement feature and the webpage feature;
   compute a static score for the advertisement by using the CTR data and the coefficient as input to a logistic regression function, wherein the static score provides relevance of the advertisement feature with respect to the webpage feature, and wherein the logistic regression function uses a monotonically increasing linear function;
   generate a unique identification for the advertisement feature; and
   generate a unique advertisement identification for the advertisement according to the static score relative to other advertisements.

2. The system of claim 1, wherein the monotonically increasing linear function is optimized by iterative scaling function.

3. The system of claim 1, wherein the monotonically increasing linear function is optimized by a nonlinear conjugate gradient function.

4. The system of claim 1, wherein the monotonically increasing linear function is optimized by a quasi-Newton function.

5. The system of claim 1, wherein the monotonically increasing linear function is optimized by an iteratively-reweighted least squares function.

6. The system of claim 1, wherein the monotonically increasing linear function is optimized by a truncated Newton function or trust-region Newton function.

7. A method for indexing advertisements in order to match an advertisement to a webpage, the method comprising:
   receiving click-through rate (CTR) data for an advertisement;
   extracting an advertisement feature from the advertisement and a webpage feature from the webpage that are relevant to each other, via a variable selection technique that includes at least one of: selection of the advertisement feature and the webpage feature using CTR data and views of the advertisement, or selection of the advertisement feature and the webpage feature using relevance scores of words of the advertisement that are independent of click feedback;
   calculating a coefficient representative of the relevancy between the advertisement feature and the webpage feature;
   computing a static score for the advertisement by using the CTR data and the coefficient as input to a logistic regression function, wherein the static score provides relevance of the advertisement feature with respect to the webpage feature, and wherein the logistic regression function uses a monotonically increasing linear function;
   generating a unique identification for the advertisement feature; and
   generating a unique advertisement identification for the advertisement according to the static score relative to other advertisements.

8. The method of claim 7, wherein the advertisement feature or the webpage feature includes a unigram.

9. The method of claim 7, wherein the advertisement feature or the webpage feature includes a phrase.

10. The method of claim 7, wherein the linear function is a monotonically increasing linear function, including one or more of an iterative scaling, a nonlinear conjugate gradient, a quasi-Newton, an iteratively-reweighted least squares, a truncated Newton, or a trust-region Newton function.

11. A non-transitory computer readable medium that stores a set of instructions executable by a computer to:
   receive click-through rate (CTR) data for an advertisement;
   extract an advertisement feature from the advertisement and a webpage feature from the webpage that are relevant to each other, via a variable selection technique that includes at least one of: selection of the advertisement feature and the webpage feature using CTR data and views of the advertisement, or selection of the advertisement feature and the webpage feature using relevance scores of words of the advertisement that are independent of click feedback;
   calculate a coefficient representative of the relevancy between the advertisement feature and the webpage feature;
   compute a static score for the advertisement by using the CTR data and the coefficient as input to a logistic regression function, wherein the static score provides relevance of the advertisement feature with respect to the webpage feature, and wherein the logistic regression function uses a monotonically increasing linear function including at least one of an iterative scaling, a nonlinear conjugate gradient, a quasi-Newton, an iteratively-reweighted least squares, a truncated Newton, or a trust-region Newton function;
   generate a unique identification for the advertisement feature; and
   generate a unique advertisement identification for the advertisement according to the static score relative to other advertisements.

* * * * *